United States Patent
Golovatai-Schmidt et al.

(10) Patent No.: US 6,613,221 B2
(45) Date of Patent: Sep. 2, 2003

(54) SIEVE FILTER FOR FLUID CONDUITS, ESPECIALLY FOR HYDRAULIC PRESSURE LINES IN INTERNAL COMBUSTION ENGINES

(75) Inventors: Eduard Golovatai-Schmidt, Röttenbach (DE); Frank Lauterbach, Höchstädt (DE); Rainer Ottersbach, Bonn (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/024,398

(22) Filed: Dec. 18, 2001

(65) Prior Publication Data

US 2002/0074273 A1 Jun. 20, 2002

(30) Foreign Application Priority Data

Dec. 19, 2000 (DE) .......................................... 100 63 283

(51) Int. Cl.$^7$ .............................................. B01D 35/147
(52) U.S. Cl. ........................ 210/131; 210/168; 210/171; 210/432; 210/497.3
(58) Field of Search ................................. 210/130, 131, 210/171, 168, 497.01, 432, 499, 497.3; 123/196 A

(56) References Cited

U.S. PATENT DOCUMENTS

| 2,566,463 A | 9/1951 | Orban |
| 4,018,686 A | 4/1977 | Shufflebarger et al. |
| 4,197,207 A | 4/1980 | Rosaen et al. |
| 4,197,209 A | 4/1980 | Zinke et al. |
| 4,459,208 A | * 7/1984 | Lemon |
| 6,428,688 B1 | * 8/2002 | Yamada |

FOREIGN PATENT DOCUMENTS

| DE | 3718068 C1 | 6/1988 |
| EP | 0965376 A1 | 12/1999 |
| GB | 995142 | 6/1965 |

* cited by examiner

*Primary Examiner*—Joseph Drodge
*Assistant Examiner*—Terry K. Cecil
(74) *Attorney, Agent, or Firm*—Volpe and Koenig, P.C.

(57) ABSTRACT

A sieve filter for fluid lines, especially for hydraulic pressure lines (2) in internal combustion engines which is formed of a hollow cylindrical main body (3) with a fluid inlet (4) and a fluid outlet (5), and of a fine mesh filter element (6) for through flow by fluid which has a bypass function when the filter element (6) is stopped up or filtering highly viscous fluid. The sieve filter (1) is biased by a spring element (7), and is insertable together with the spring element (7), between two axially spaced opposing surfaces (8, 9) inside the pressure line (2) such that its fluid inlet (4) and the spring element (7) are prestressed against the opposing surfaces (8, 9), whereby the main body (3) of the sieve filter (1) closes a bypass fluid channel passing the filter element (6) which is clearable through an axial displacement of the main body (3) against the force of the spring element (7) resulting from the rise of fluid pressure on the filter element.

5 Claims, 4 Drawing Sheets

SIEVE FILTER FOR FLUID CONDUITS, ESPECIALLY FOR HYDRAULIC PRESSURE LINES IN INTERNAL COMBUSTION ENGINES

BACKGROUND

The invention is directed to a sieve filter for fluid conduits having a hollow cylindrical main body with a fluid inlet and a fluid outlet, and a fine mesh filter element adapted to allow fluid flow therethrough, with a bypass for use when the filter element is stopped up or in the event of highly viscous fluid, and it is especially advantageously suited for hydraulic pressure lines in internal combustion engines.

It is generally known to the person skilled in the art that, after assembly of the individual parts of an internal combustion engine, it is not possible to avoid some finishing-related dirt particles, such as shavings, jointing solution residues and the like, remaining in the interior of internal combustion engine despite cleaning of the individual parts. Especially with internal combustion engines which are outfitted with a hydraulic device for relative rotation of the camshaft relative to the crankshaft of the internal combustion engine, there exists the danger of these dirt particles getting into the lubricant circulation of the internal combustion engine from which also the device for relative rotation of the camshaft is hydraulically supplied. Since as a rule an electromagnetic control valve is connected in series ahead of this device, which controls fluid feed and removal to and from this device through one of the camshaft bearings in the cylinder head of the internal combustion engine, it is consequently not to be ruled out that if dirt particles exceed a certain magnitude, they will cause impairments in the function of the control valve up to completely blocking it. A thorough cleaning of the individual parts of the internal combustion motor for avoiding these impairments of function has, however, above all in mass production, proven to be uneconomical, so that in order to create a remedy, first of all a fine mesh wire filter was incorporated into the oil duct to the electromagnetic control valve of the device. This filter indeed protects the control valve from the penetration of dirt particles, but in practice it has nonetheless become apparent that if the filter becomes completely stopped up, not only do malfunctions occur with the device to be controlled, but also undersupplying lubricants to the camshaft bearing used to feed and remove fluid occurs, which can in the worst case lead to total failure of the internal combustion engine due to bearing seizures.

Through genus-defining EP 0 965 376 A1, a rod-like pipe filter for fluid conduits was proposed which is arranged in a junction of a pressure line and makes available a bypass function when the filter element is stopped up. This pipe filter basically consists of a fine mesh filter element and a hollow cylindrical main body of plastic which forms a fluid inlet and a fluid outlet through stiffening bars joined with each other. The stiffening bars are here provided with cam-like spacers which keep the filter element at a distance to the walling of the pressure line. The fluid inlet of the pipe filter is sealed off toward the walling of the pressure line while the fluid outlet lying on a shoulder in the pressure line has several bypass openings which create a connection from the interior of the pipe filter to the exterior. Under normal operating conditions, the main flow of the fluid consequently takes place through the interior of the pipe filter through its filter element into the exterior as well as toward the junction of the pressure line. When the filter element is stopped up, or in the event of highly viscous fluid, the fluid reaches the exterior unfiltered through the bypass openings in the fluid outlet to the exterior and consequently likewise the junction of the pressure line.

The disadvantage with this known pipe filter is, however, that this is usable only in the region of a junction of a pressure line and consequently presupposes a certain configuration of the fluid passages in an internal combustion motor which do not always exist or are not always realizable. Above and beyond this, the construction of the bypass function of this pipe filter has, at least under normal conditions, the disadvantage that the fluid, following the principle of the least resistance, rather passes unfiltered through the constantly opened bypass opening in the fluid outlet to the exterior of the pipe filter as well to the junction of the pressure line than flows filtered as anticipated through the fine mesh filter tissue to the exterior of the pipe filter and to the junction of the pressure conduit. In this way, a pipe filter of this type is practically functionless, so that the dirt particles contained in the fluid most of the time forge ahead unhindered to the unit to be provided with a finely filtered fluid and can cause the functional disturbances mentioned with an electromagnetic control valve. Moreover, it cannot be ruled out that when using the fluid flow through the bypass openings at the fluid outlet of the pipe filter, already filtered out dirt particles from the interior of the pipe filter are carried along through the bypass openings to the junction of the pressure line so that the danger of functional disturbances on an electromagnetic control valve is increased even further.

Moreover, through DE 37 18 068 C1, an additional rod-like sieve filter is known which is comparable in basic construction with the previously mentioned solution and is especially suited for incorporation in the flow pathway of a hydraulic control device of a fuel injection pump for an internal combustion engine. This rod-like sieve filter likewise constructed with a bypass function has (for the event of a paraffin stoppage of its sieve mesh fabric at extremely low temperatures) in its interior an additional bypass pipe with a pressure relief valve opening in the direction of flow which is arranged at the height of the fluid inlet of the sieve filter and is constructed as a sprung ball valve or as a thermostat valve.

With this inherently very advantageous sieve filter for fluid lines, it is indeed possible to avoid the disadvantages of the previously mentioned solution to a great extent. But it has the disadvantage that its manufacture demands high finishing expenditures and costs due to the additional bypass pipe.

SUMMARY

For this reason, underlying the invention is the object of designing an economical sieve filter for fluid lines which is simply assembled with regard to construction, especially for hydraulic pressure lines in internal combustion engines, which is insertable at any desired site within a fluid line or passage and makes available a bypass function which permits a fluid flow through the bypass only when the filter element is clogged or in the event of highly viscous fluid and thereby avoids carrying along dirt particles already filtered out of the fluid.

In accordance with the invention, this object is accomplished with a sieve filter having a hollow cylindrical main body (3, 3') with a fluid inlet (4, 4') and a fluid outlet (5, 5'), and a fine mesh filter element (6, 6') adapted to allow fluid flow therethrough, with a bypass for use when the filter element (6, 6') is stopped up or in the event of highly viscous fluid, wherein the fluid outlet of the sieve filter stands in operative connection with a spring element, and the sieve filter together with the spring element is insertable between two opposing surfaces spaced axially apart inside the pressure line so the fluid inlet of the sieve filter and the spring element lie under prestress on the opposing surfaces, and the main body of the sieve filter is movable axially between the opposing surfaces. The main body of the sieve filter thereby closes off, when the filter element is subject to normal through flow, an additional bypass fluid channel passing the filter element of the sieve filter which is openable when the filter element is clogged or in the case of highly viscous fluid, through an axial displacement of the main body of the sieve filter against the force of the spring element resulting from the rise of fluid pressure on the filter element.

In a preferred application of the sieve filter of the invention, the pressure line constructed with the opposing surfaces is here built as an oil channel to a device for relative rotation of a camshaft relative to a crankshaft of an internal combustion engine and the sieve filter is installed directly before the electromagnetic control valve of the device in the pressure line. This electromagnetic control valve is arranged with its cylindrical valve element inside the insertion bore hole which is either directly incorporated into the cylinder head of the internal combustion engine or is incorporated into a valve housing. Here the pressure line opens axially into the insertion bore hole, which preferably has a larger diameter, so that the shoulder formed between the pressure line and the insertion bore hole is usable as an opposing surface for the fluid outlet of the sieve filter. The opposing surface of the spring element standing in operating connection with the fluid outlet of the sieve filter is in contrast formed by the face or an annular surface of the valve element of the electromagnetic control valve arranged in its vicinity. It is nonetheless also possible (through a local diameter extension of the pressure line which forms the opposing surface for the fluid inlet and for the spring element of the sieve filter) to arrange the sieve filter at its desired site inside the pressure line.

With a first preferred embodiment of the sieve filter constructed in accordance with the invention, its hollow cylindrical main body is preferably formed by an annular fluid inlet and a sleeve-like fluid outlet with in any given case identical inside and outside diameters which are connected with each other through their inside annular surfaces that extend toward each other through several evenly peripherally distributed stiffening bars at an axial distance to each other. On the interior annular surface of the fluid inlet, the filter element (preferably constructed in the form of a hollow frustrum) of the sieve filter with its opening is in addition fastened here, which extends axially up to the fluid outlet of the sieve filter. Such a form of the filter element has here proven especially advantageous in a two respects since first, the enlarged surface of the filter element guarantees a large fluid flow through, and second, the basket-like construction of the spring element makes possible the gathering of a larger amount of dirt particles.

The sleeve-like fluid outlet of the sieve filter is then, in a further configuration of the first embodiment of the invention, arranged between the opposing surfaces of the sieve filter in the pressure line such that it, with its outer surface, closes the opening of an additional bypass line fed back with the pressure line. Through this additional bypass line, the fluid is conducted unfiltered through the spacings between the stiffening bars of the sieve filter and past the filter element to the fluid outlet when, upon the filter element becoming stopped up or in the event of highly viscous fluid, an axial displacement of the sieve filter in the flow direction takes place and the fluid outlet clears the opening of the bypass line.

In an alternative configuration of the first embodiment of the sieve filter of the invention, it is also possible to construct the fluid inlet just like the sleeve-like fluid outlet of the filter and to connect it with this through stiffening bars or to form it with the main body of the sieve filter through a one piece pipe sleeve. In this case, it also offers itself for forwarding the fluid in the bypass position of the sieve filter to arrange on the outer surface of the main body at the same place as the interstices between the stiffening bars several evenly peripherally distributed radial boreholes through which the fluid can be conducted past the stopped up filter element. Here the filter element can also have other shapes concave in the direction of flow than the shape of a hollow frustrum previously mentioned or also may be constructed disk-like if the fluid flow through attainable therewith appears sufficient. Independently of the respective configuration of such a sieve filter, it is moreover advantageous in the event that the stiffening bars or the bars between the radial bore holes in the main body of the sieve filter have a width corresponding approximately to the diameter of the additional bypass bore hole to flatten off somewhat the thickness of the material of these bars, for example by a circular annular groove, so that even when one of these bars of the sieve filter is arranged directly over the opening of the bypass conduit, the fluid flow past the filter element is possible through the filter element.

A likewise preferred second embodiment of the sieve filter constructed in accordance with the invention differs from the first embodiment described chiefly in that, for the bypass function of the sieve filter, no additional bypass line fed by the pressure line is necessary any more. With this construction, the hollow cylindrical main body of the sieve filter is preferably formed by a one part pipe sleeve in which the in this case preferably disk-like constructed filter element is fastened approximately in the middle axially. On the outer surface of the main body, several evenly peripherally distributed distancing bars are arranged here over its axial length which lie on the inner walling of the pressure line or the insertion bore hole, and between which are formed several ring segment shaped bypass channels bounded by the outer surface of the main body and the inner walling of the pressure line.

In further configuration of the second embodiment of the invention, the hollow cylinder main body of the sieve filter is then arranged in the pressure line or the insertion bore hole such that the fluid inlet face side on the opposing surface in the pressure line closes the bypass channels formed between the distancing bars of the main body. Through these bypass channels, the fluid is conducted along the outer surface of the main body past the filter element unfiltered to the fluid outlet of the sieve filter when an axial displacement of the sieve filter in the direction of the current takes place in the event that the filter element is stopped up or with highly viscous fluid, and the fluid inlet opens the bypass channels.

It is also, of course, possible with this embodiment of the sieve filter of the invention in an alternative configuration to insert, instead of a disk-like filter element, a filter element concave in the direction of flow into the pipe sleeve in order to attain a higher flow throughput and a higher collection capacity for the dirt particles. It is equally possible as an equivalent construction in relation to the distancing bars on the outer surface of the main body, instead of this, to incorporate into the outer surface of the main body over its entire length, several evenly or optionally unevenly peripherally distributed grooves which then form the bypass channels bounded by the respective groove floor and by the inner walling of the pressure line.

The sieve filter constructed in accordance with the invention, especially for hydraulic pressure lines in internal combustion engines, consequently has in both embodiments in relation to the sieve filters known from the state of the art the advantage that this just like the sieve filter without bypass function is economically manufacturable on the basis of a simple plastic main body and a fine mesh filter element, and merely offers a bypass function in interaction with a spring element and minor modification on its main body and/or on the pressure line which permits a fluid flow through the bypass only when the filter element is clogged or with highly viscous fluid and thereby effectively avoids carrying along dirt particles already filtered out of the fluid. When using a sieve filter constructed in accordance with the invention in a pressure line to a device for relative rotation of the camshaft in relation to the crankshaft of an internal combustion engine, it is in this way possible to protect effectively the electromagnetic control valve of the device from the penetration of dirt particles and the functional impairments associated therewith and at the same time to rule out an undersupply of lubricants to the camshaft bearing used for pressure medium supply and removal.

BRIEF DESCRIPTION OF THE DRAWING(S)

The invention will be described in greater detail below on the basis of two preferred embodiments, whereby in the associated drawings.

DETAILED DESCRIPTION OF THE PREFERRED EMBODIMENT(S)

Figure 1:
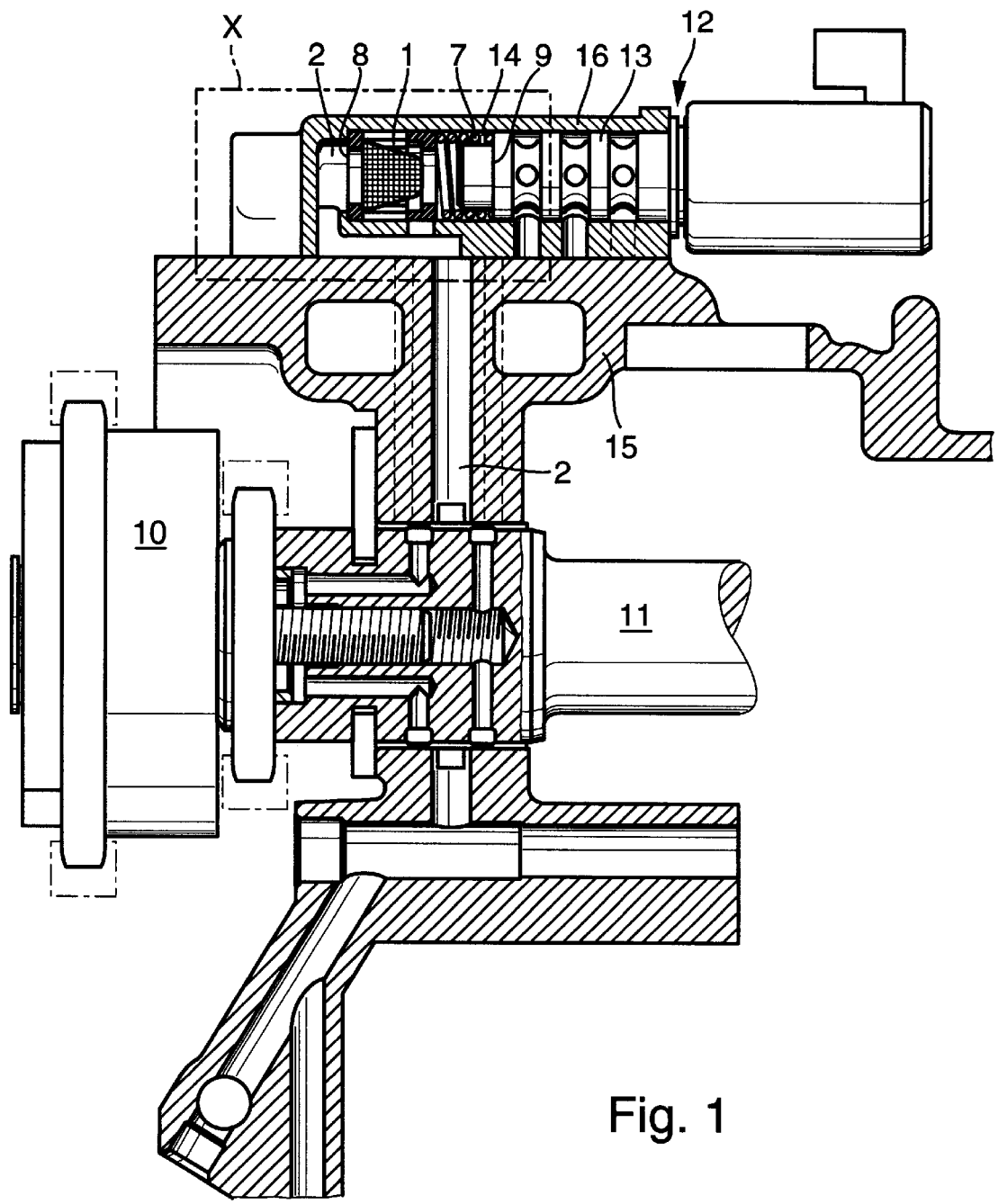
FIG. 1 is a plan view of a cylinder head of an internal combustion engine with a device for relative rotation of the camshaft in relation to the crankshaft with a first embodiment of the sieve filter of the invention inserted in the pressure line.
Figure 5:
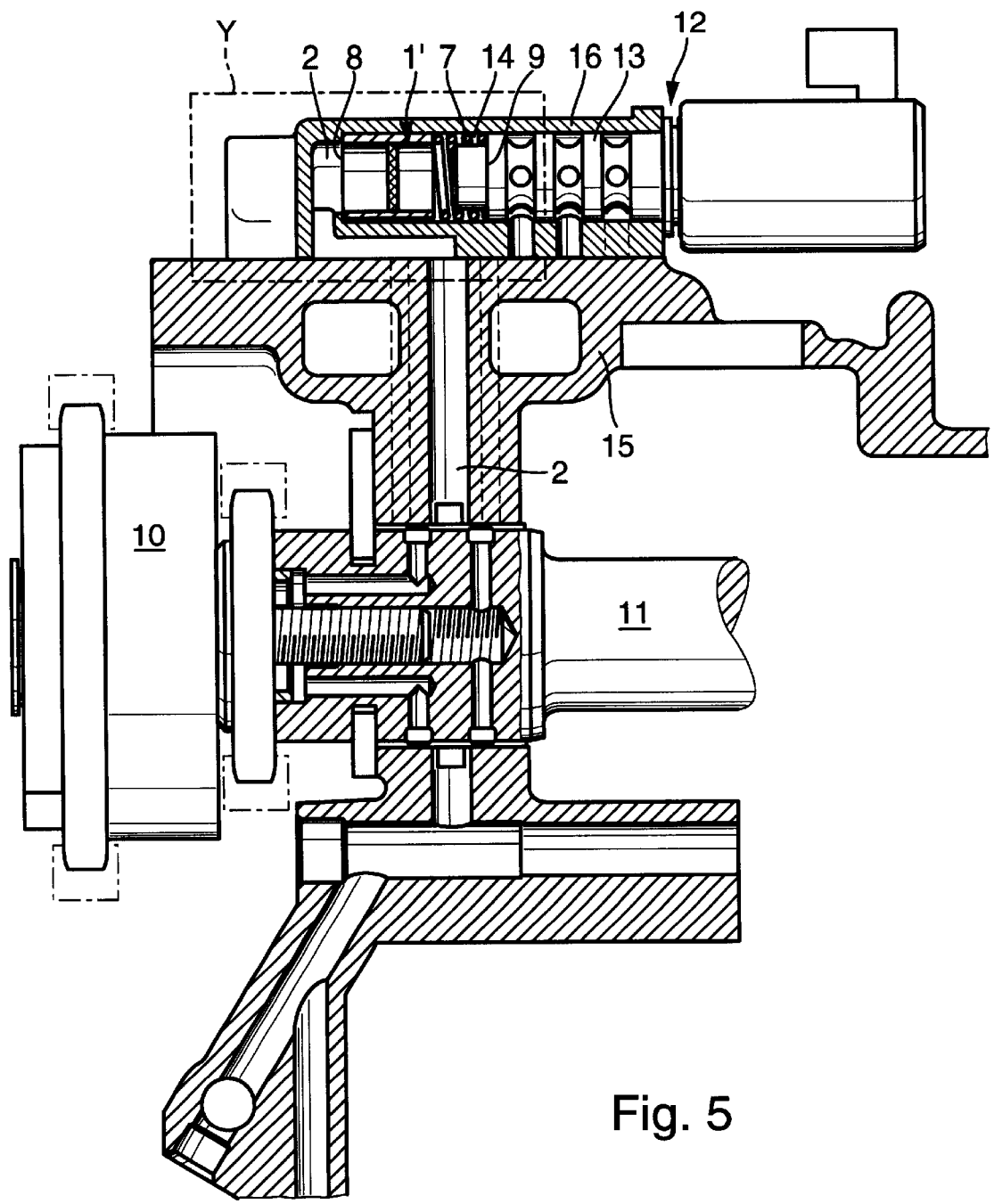
FIG. 5 is a plan view of a cylinder head of an internal combustion engine with a device for relative rotation of the camshaft in relation to the crankshaft with a second embodiment of the sieve filter of the invention inserted in the pressure line.

In FIGS. 1 and 5, a partial view of the cylinder head 15 of an internal combustion engine is shown which is constructed with a device 10 for relative rotation of the camshaft 11 in relation to the crankshaft (not shown). This device 10 is clearly visibly fastened on the end of camshaft 11 and is provided with motor oil as hydraulic fluid from a likewise not represented motor oil pump through pressure line 2 as well as through an electromagnetic control valve 12 through the camshaft bearing (not indicated in more detail) in the cylinder head 15 of the internal combustion engine. It is also recognizable from FIGS. 1 and 5 that inside the pressure line 2 to this device 10, a sieve filter 1, 1' is arranged for filtering out manufacturing-related dirt particles from the hydraulic fluid which, as FIGS. 2 and 6 make clear, basically is formed of a hollow cylindrical main body 3, 3' with a fluid inlet 4, 4' and a fluid outlet 5, 5' as well as of a filter element 6, 6' through which fluid flows.

This sieve filter 1, 1' offers a bypass function when the filter element 6, 6' is clogged or in the event of highly viscous fluid since the fluid outlet 5, 5' in accordance with the invention stands in operating connection with a spring element 7, and the sieve filter 1, 1' together with the spring element 7 are installed between two axially spatially separated opposing surfaces 8, 9 inside the pressure conduit 2 such that the fluid inlet 4, 4' of the sieve filter 1, 1' and the spring element 7, as shown in FIGS. 1 and 2 or 5 and 6, lie under prestress on the opposing surfaces 8, 9 and the main body 3, 3' of the sieve filter 1, 1' is axially movable between the opposing surfaces 8, 9. The position of the sieve filter 1, 1' represented in these figures here corresponds to its normal position wherein fluid flows through the filter element 6, 6' and the main body 3, 3' of the sieve filter closes off fluid tight a separate bypass fluid channel passing by filter element 6, 6' explained in greater detail below which is clearable when the filter element 6, 6' is stopped up or in the event of highly viscous fluid by an axial displacement of the main body 3, 3' of the sieve filter 1, 1' resulting from the rise of fluid pressure on the fluid element 6, 6' against the force of the spring element 7.

As is in addition apparent from FIGS. 1 and 5, the sieve filter 1, 1' constructed in accordance with the invention is here arranged directly before the electromagnetic control valve 12 of device 10 which is arranged with its cylindrical valve element 13 within an insertion bore hole 14 which in incorporated into a valve housing 16 fastened on the cylinder head 15 of the internal combustion engine. Here the pressure line 2 opens axially into the insertion bore hole 14 having a greater diameter so that a step-like shoulder formed between the insertion bore hole 14 and the pressure line 2 forms the opposing surface 8 for the fluid inlet 4, 4' of the sieve filter 1, 1', while an annular surface arranged in the vicinity of the face of the cylindrical valve element 13 of the electromagnetic control valve 12 is constructed as the opposing surface 9 of spring element 7 standing in operating connection with the fluid outlet 5, 5' of the sieve filter 1, 1'.

Figure 2:
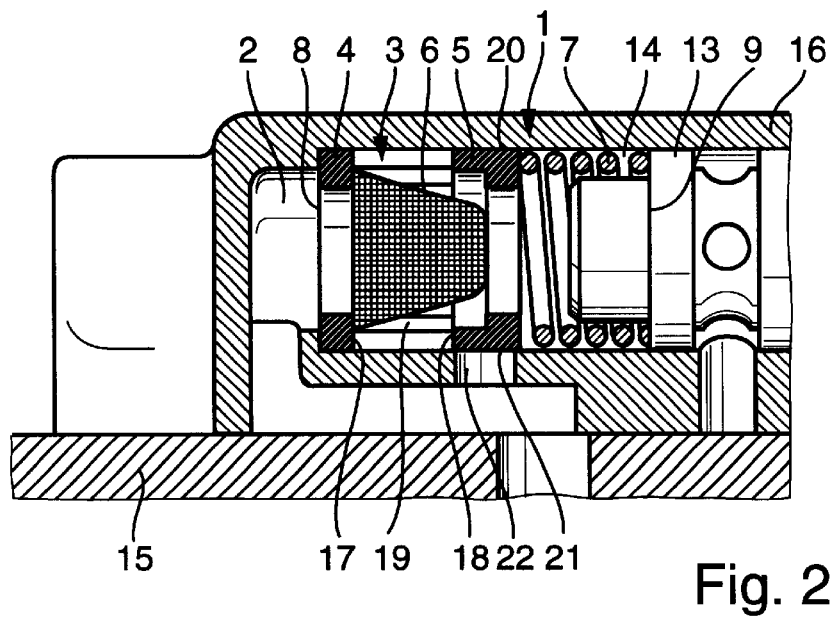
FIG. 2 is an enlarged representation of detail X according to FIG. 1 with the first embodiment of the sieve filter of the invention arranged in front of the control valve of the device in a normal position.
Figure 3:
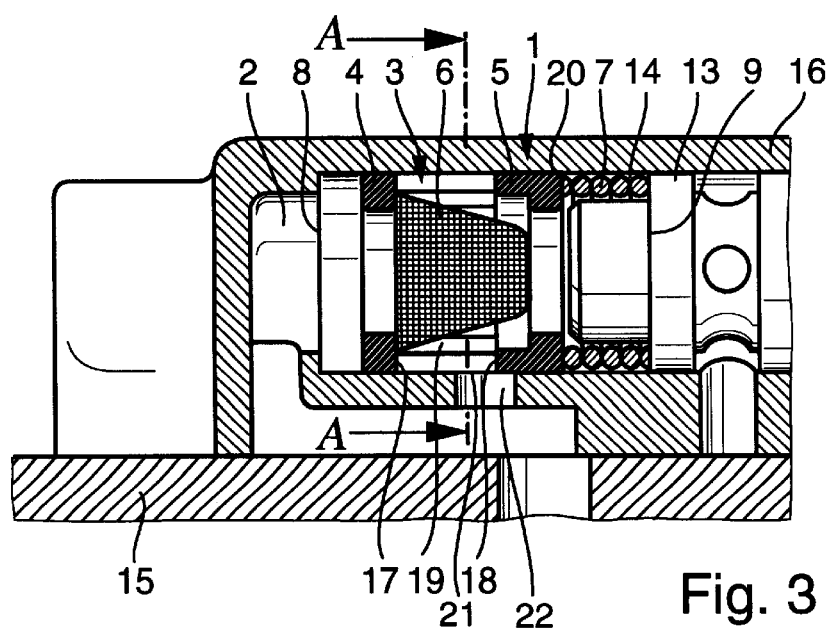
FIG. 3 is an enlarged representation of detail X according to FIG. 1 with the first embodiment of the sieve filter of the invention arranged before the control valve of the device in a bypass position.
Figure 4:
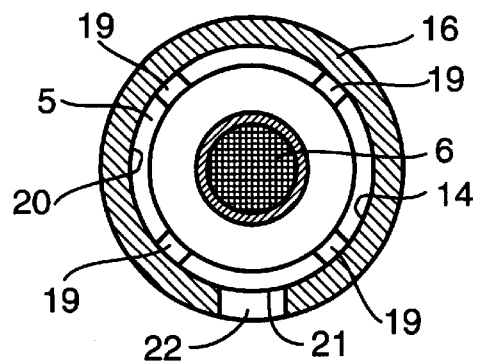
FIG. 4 is an enlarged cross-sectional view taken along line A—A in FIG. 3 through the first embodiment of the sieve filter of the invention arranged before the control valve of the device.

With the first embodiment of the sieve filter 1 of the invention represented in detail in FIGS. 2 to 4, its hollow cylindrical main body 3 is formed by a ring-like fluid inlet 4 and a sleeve-like fluid outlet 5 which have the same inside and outside diameters and which are connected with each other through their interior annular surfaces 17, 18 which face toward each other through four evenly peripherally distributed stiffening bars 19, as shown in FIG. 4. The filter element 6 of the sieve filter 1 is attached on the interior annular surface 17 of the fluid inlet 4, and the filter element 6 extends axially toward the fluid outlet 5 of the sieve filter 1 and has the form of a hollow frustrum in order to enable a high fluid through flow and the collection of a greater amount of dirt particles.

With respect to the already mentioned bypass function of the first embodiment of the sieve filter 1 of the invention, it is in addition recognizable from FIG. 2 that the sleeve-like fluid outlet 5 in the normal position of sieve filter 1, with its outer surface 20, closes the opening 21 of an additional bypass line 22 fed from pressure line 2 so that the fluid can flow through the fluid inlet 4 and through the filter element 6 to the fluid outlet of the sieve filter 1 or into the valve element 13 of the electromagnetic control valve 12. If the filter element 6 of sieve filter 1 is stopped up with dirt particles or if the fluid (for example, due to temperature) has a high viscosity, the axial displacement of the main body 3 of the sieve filter 1 into its bypass position takes place in which the fluid is conducted through the interstices between the stiffening bars 19 of the main body 3 and past the filter element 6 unfiltered to the fluid outlet 5 of the sieve filter 1 as well as into the valve element 13 of the electromagnetic valve element 12.

Figure 6:
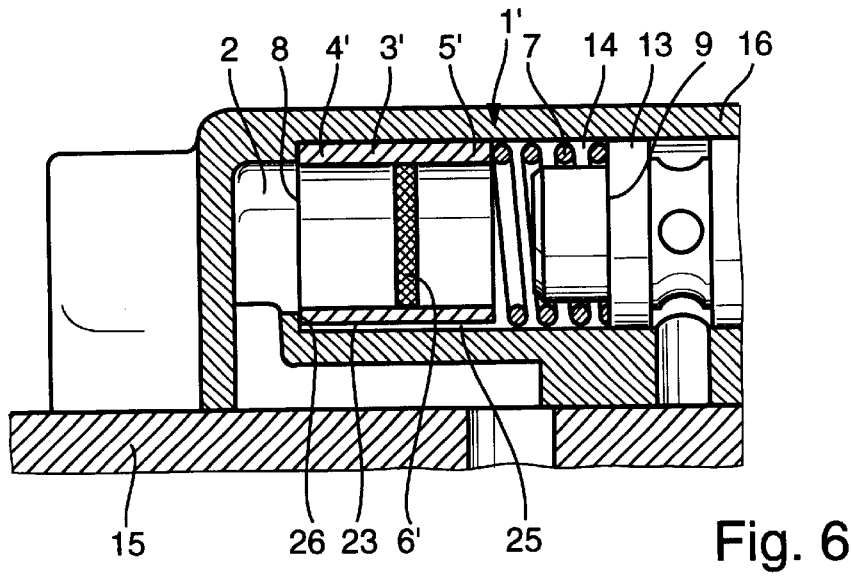
FIG. 6 is an enlarged representation of detail Y according to FIG. 5 with the second embodiment of the sieve filter of the invention arranged in front of the control valve of the device in a normal position.
Figure 7:
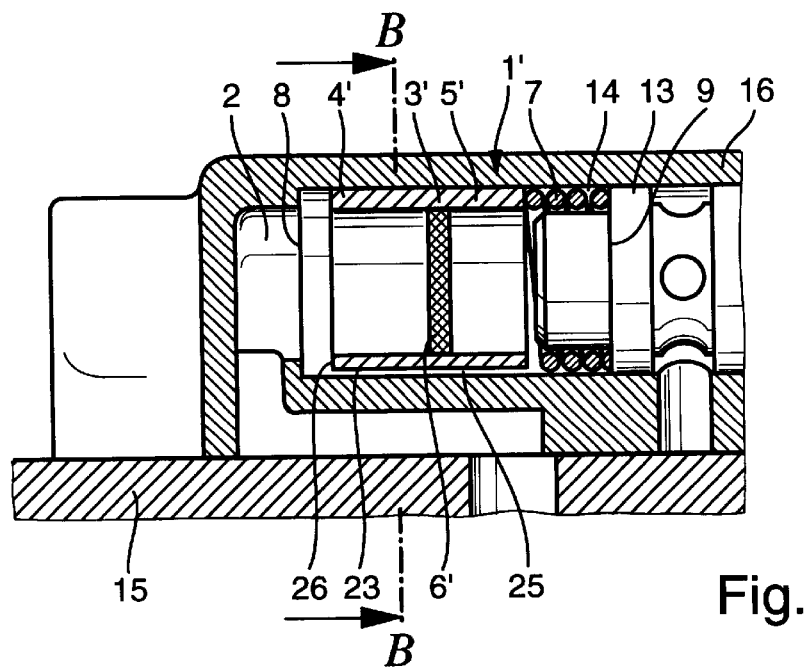
FIG. 7 is an enlarged representation of detail Y according to FIG. 5 with the second embodiment of the sieve filter of the invention arranged before the control valve of the device in a bypass position.
Figure 8:
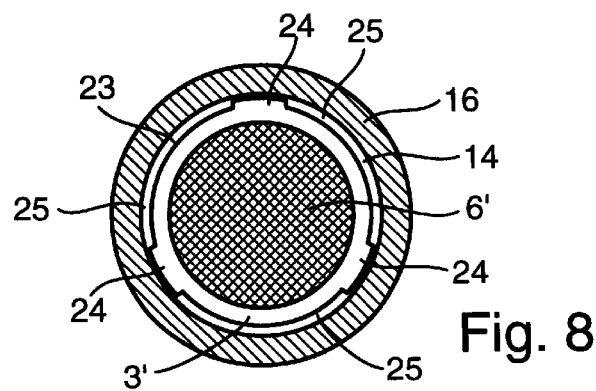
FIG. 8 is an enlarged cross-sectional view taken along line B—B in FIG. 7 through the second embodiment of the sieve filter of the invention arranged before the control valve of the device.

The second embodiment of the sieve filter 1' of the invention represented in greater detail in FIGS. 6 to 8 differs from the first embodiment basically in that the hollow cylindrical main body 3' of the sieve filter 1' is formed by a pipe sleeve in which the disk-like filter element 6' is fastened approximately in the center. Here, three evenly peripherally distributed distancing bars 24, shown in FIG. 8, are arranged over its entire length, which lie on the interior walling of the insertion bore hole 14 and between which three bypass channels 25, which have an annular segment cross-section, are formed, which are bounded by the outer surface 23 of the main body 3' and the inner walling of the insertion bore hole 14.

The bypass function in this second embodiment of the sieve filter 1 of the invention is realized such that the fluid inlet 4', which lies on the opposing surface 8 in the insertion bore hole 14 in the normal position of the sieve filter 1' shown in FIG. 6 with its outer annular surface 26, closes the bypass channels 25 formed between the distancing bars 24 so that the fluid can flow through the fluid inlet 4' and through the filter element 6' to the fluid outlet 5' of the sieve filter 1' or into the valve element 13 of the electromagnetic control valve 12. When the filter element 6' of the sieve filter 1' is stopped up with dirt particles or in the event of temperature-conditioned highly viscous fluid, the axial displacement of the main body 3' of the sieve filter 1' into its bypass position also takes place in this embodiment, as represented in FIG. 7, in which the fluid is conducted unfiltered along the outside surface 23 of the main body 3' past the filter element 6' to the fluid outlet 5' of the sieve filter 1' as well as into the valve element 13 of the electromagnetic control valve 12.

Reference Number List

1, 1' Sieve filter
2 Pressure line
3, 3' Main body
4, 4' Fluid inlet
5, 5' Fluid outlet
6, 6' Filter element
7 Spring element
8 Opposing surface
9 Opposing surface
10 Device
11 Camshaft
12 Control valve
13 Valve element
14 Insertion borehole
15 Cylinder head
16 Valve housing
17 Interior annular surface
18 Interior annular surface
19 Stiffening bars
20 Outer surface
21 Opening
22 Bypass line
23 Outer surface
24 Distance bars
25 Bypass ducts
26 Outer annular surface

What is claimed is:

1. Sieve filter for fluid conduits, comprising a hollow cylindrical main body (3, 3') with a fluid inlet (4, 4') and a fluid outlet (5, 5'), and a fine mesh filter element (6, 6') adapted to allow fluid flow therethrough, the fluid outlet (5, 5') of the sieve filter (1, 1') is operatively connected to a spring element (7), and the sieve filter (1, 1') together with the spring element (7) are insertable between two axially spaced opposing surfaces (8, 9) inside a fluid conduit (2), the fluid inlet (4, 4') of the sieve filter (1, 1') and the spring element (7) are prestressed against the opposing surfaces (8, 9) and the main body (3, 3') of the sieve filter (1, 1') is movable axially between the opposing surfaces (8, 9), whereby when the filter element (6, 6') is subject to normal fluid through flow, the main body (3, 3') of the sieve filter (1, 1') is arranged so that a separate fluid bypass line that bypasses the filter element (6, 6') of the sieve filter (1, 1'), is closed, and when the filter element (6, 6') is stopped up or filtering highly viscous fluid, an axial displacement of the main body (3, 3') of the sieve filter (1, 1') takes place against the force of the spring element (7) resulting from a rise of fluid pressure on the filter element (6, 6'), wherein the conduit (2) is an oil pressure line which provides an oil channel to a device (10) for relative rotation of a camshaft (11) in relation to a crankshaft of an internal combustion engine, and the sieve filter (1, 1') is arranged directly before an electromagnetic control valve (12) of the device, a cylindrical valve element (13) of the device is located inside an insertion bore hole (14) which is incorporated into a cylinder head (15) of the internal combustion engine or a valve housing (16) fastened on the cylinder head (15) of the internal combustion engine, the pressure line (2) opens axially into the insertion bore hole (14), which has a greater diameter than the pressure line to form a step-like shoulder that forms the one opposing surface (8) for the fluid inlet (4, 4') of the sieve filter (1, 1'), and a face or an annular surface of the valve element (13) of the electromagnetic control valve (12) forms the second opposing surface (9) upon which the spring element (7) acts.

2. Sieve filter according to claim 1, wherein the hollow cylindrical main body (3) of the sieve filter (1) is formed with an annular fluid inlet (4) and a sleeve-like fluid outlet (5) having the same inside and outside diameters, and are connected with each other through a plurality evenly peripherally distributed stiffening bars (19) that extend between inner annular surfaces (17, 18) of the annular fluid inlet and sleeve-like fluid outlet so that they are spaced apart by an axial distance whereby, the filter element (6) of the sieve filter (1) is constructed in the form of a hollow frustrum connected on the inner annular surface (17) of the fluid inlet (4).

3. Sieve filter according to claim 2, wherein the sleeve-like fluid outlet (5) of the sieve filter (1) with its outer surface (20) is arranged to close an opening (21) of an additional bypass line that is fed by the pressure line (2), through which the fluid is conductible unfiltered upon an axial displacement of the sieve filter (1) through interstices between the stiffening bars (19) and past the filter element (6) to the fluid outlet (5).

4. Sieve filter according to claim 1, wherein the hollow cylindrical main body (3') of the sieve filter (1') is formed by a pipe sleeve in which the filter element (6') of the sieve filter (1'), is constructed in a disk-like form, on an outer surface (23) of the main body (3'), over its axial length, a plurality of evenly peripherally distributed distancing bars (24) are arranged which lie against an inner walling of the pressure line (2), between which a plurality of annular segment-like in cross section bypass channels (25) bounded by the outer surface (23) of the main body (3') and the inner walling of the pressure line are provided.

5. Sieve filter according to claim 4, wherein the fluid inlet (4') lying on the first opposing surface (8) in the pressure line (2) is arranged with an outer ring surface (26) thereof to close bypass ducts (25) formed between the distance bars (24), through which the fluid is conductible in the event of an axial displacement of the sieve filter (1') along the outer surface (23) of the main body (3') past the filter element (6') unfiltered to the fluid outlet (5').

* * * * *